United States Patent [19]
Lehman et al.

[11] Patent Number: 5,529,141
[45] Date of Patent: Jun. 25, 1996

[54] KIT FOR CONVERTING A MOTORCYCLE TO A TRICYCLE

[76] Inventors: John Lehman, Box 2940, Westlock, Alberta, Canada, T0G 2L0; Larry D. Strilchuk, 4 Fieldstone Place, Spruce Grove, Alberta, Canada, T7X 2Z4

[21] Appl. No.: 235,889

[22] Filed: May 2, 1994

[30] Foreign Application Priority Data

Dec. 10, 1993 [CA] Canada .................................. 2111625

[51] Int. Cl.⁶ .................................................. B62K 13/04
[52] U.S. Cl. ............................................ 180/209; 180/215
[58] Field of Search ..................................... 180/209, 210, 180/215, 16, 217

[56] References Cited

U.S. PATENT DOCUMENTS

| | | | |
|---|---|---|---|
| 1,933,102 | 10/1933 | DuPont et al. | 180/210 |
| 1,956,319 | 4/1934 | DuPont et al. | 180/16 |
| 4,287,960 | 9/1981 | McConnell | 180/209 X |
| 4,325,449 | 4/1982 | D'Addio et al. | 180/210 X |
| 4,582,157 | 4/1986 | Watanabe | 180/217 X |

*Primary Examiner*—Margaret A. Focarino
*Assistant Examiner*—F. Zeender
*Attorney, Agent, or Firm*—Anthony R. Lambert

[57] ABSTRACT

All improvement in a kit for converting a motorcycle to a tricycle is described. The kit includes a pair of swing arms having a first end and a second end. Axle couplings are provided at the first end of each swing arm whereby the swing arms are secured to an axle which supports two wheels. Pin receiving couplings are provided at the second end of each swing arm whereby the swing arms are pivotally secured by pins to a motorcycle frame. The improvement is characterized by swing arms having a top surface and a bottom surface. The axle coupling and the pin receiving coupling extend vertically from the top surface of the swing arms. The top positioning of the axle couplings and the pin receiving couplings leaves the majority of the top surface of the swing arms dropped below the level of the original floor boards of the motorcycle. The swing arms can pivot as intended without their movement being impeded by the original floor boards.

5 Claims, 3 Drawing Sheets

KIT FOR CONVERTING A MOTORCYCLE TO A TRICYCLE

The present invention relates to a kit for converting a motorcycle to a tricycle.

BACKGROUND OF THE INVENTION

Kits that convert motorcycles to tricycles generally include a swing arm that is pivotally mounted to the frame of the motorcycle to support a rear axle upon which two wheels are mounted. Every effort is made to use as much of the original motorcycle equipment as is possible. A problem is invariably encountered with the floorboards provided for passengers on the motorcycle. The floor boards tend to be in the way of the swing arm and must be moved. The problem has been addressed in the prior art in one of two ways. One solution is to mount the floor boards on top of the swing arm. The problem with this solution is that the floor boards move up and down with the pivotal movement of the swing arm. The up and down movement can leave the passenger with an uncomfortable sensation. Another solution is to use extension brackets to raise the floor boards. The problem with this solution is that it leaves the passenger in a cramped position.

SUMMARY OF THE INVENTION

What is required is a form of conversion kit that uses a different approach to using the original floor boards.

According to the present invention there is provided an improvement in a kit for converting a motorcycle to a tricycle. The kit include a pair of swing arms having a first end and a second end. Axle couplings are provided at the first end of each swing arm whereby the swing arms are secured to an axle which supports two wheels. Pin receiving couplings are provided at the second end of each swing arm whereby the swing arms are pivotally secured by pins to a motorcycle frame. The improvement is characterized by swing arms having a top surface and a bottom surface. The axle coupling and the pin receiving coupling extend vertically from the top surface of the swing arms.

With the kit, as described above, the top positioning of the axle couplings and the pin receiving couplings leaves the majority of the top surface of the swing arms dropped below the level of the original floor boards of the motorcycle. The swing arms can pivot as intended without their movement being impeded by the floor boards.

Although beneficial results may be obtained through the use of the kit, as described above, a second problem experienced with tricycles constructed from conversion kits is excessive lateral sway under heavy loading. Even more beneficial results may, therefore, be obtained when the swing arms are tubular. It has been found that tubular swing arms are less prone to lateral movement. Good results have been obtained when the tubular swing arms are square in cross-section.

Although beneficial results may be obtained through the use of the kit, as described above, a third problem experienced with tricycles constructed from conversion kits is motorcycle frame failure where the pins attach the pin receiving ends of the swing arms to the motorcycle frame. This can take the form either of a cracking of the motorcycle frame itself or removal of a threaded pin receiving insert. Even more beneficial results may, therefore, be obtained when a reinforcing frame is provided. The reinforcing frame is insertable within the motorcycle frame such that the motorcycle frame is pinched between the pins mounting the second ends of the swing arms to the motorcycle frame and the reinforcing frame. It has been found that with the pins tied to the reinforcing frame, rather than the motorcycle frame, the strain previously placed upon the motorcycle frame is relieved. A preferred shape for the reinforcing frame is rectangular.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
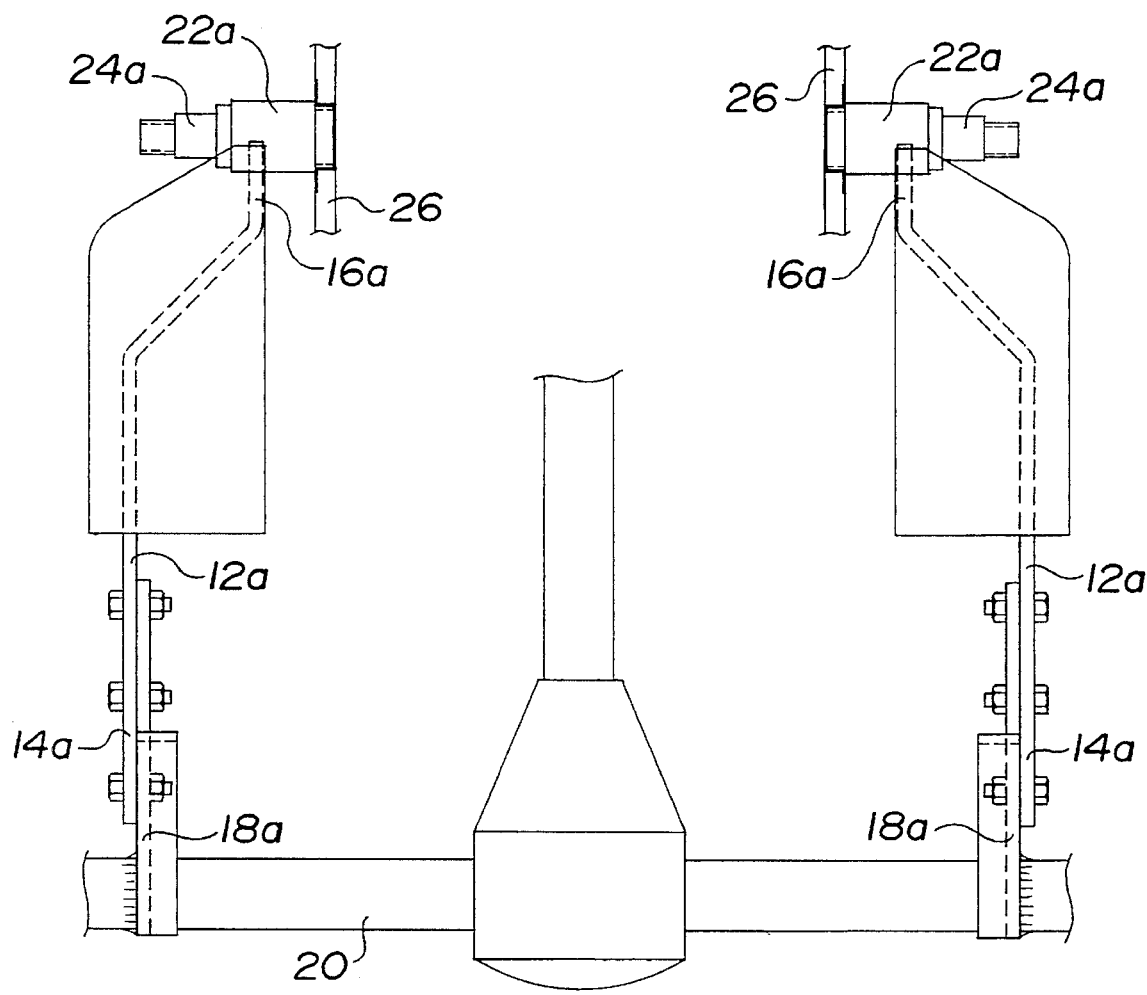
FIG. 1, labelled as PRIOR ART, is a top plan view of a kit for converting a motorcycle to a tricycle.

The preferred embodiment, an improvement in a kit for converting a motorcycle to a tricycle generally identified by reference numeral 10, will now be described with reference to FIGS. 1 through 5.

Figure 2:
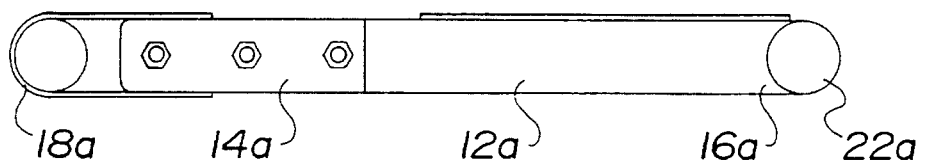
FIG. 2, labelled as PRIOR ART, is a side elevation view of a swing arm from the kit illustrated in FIG. 1.

Referring to FIG. 1, a PRIOR ART KIT for converting a motorcycle to a tricycle generally includes a pair of swing arms 12a having a first end 14a and a second end 16a. Axle couplings 18a are provided at first end 14a of each of swing arms 12a whereby swing arms 12a are secured to an axle 20 which supports two wheels (not shown). Pin receiving couplings 22a are provided at second end 16a of each of swing arms 12a whereby swing arms 12a are pivotally secured by pins 24a to a motorcycle frame 26. Referring to FIG. 2, the shape and configuration of swing arm 12a is to be noted and, in particular, the positioning of axle couplings 18a and pin receiving couplings 22a.

Figure 3:
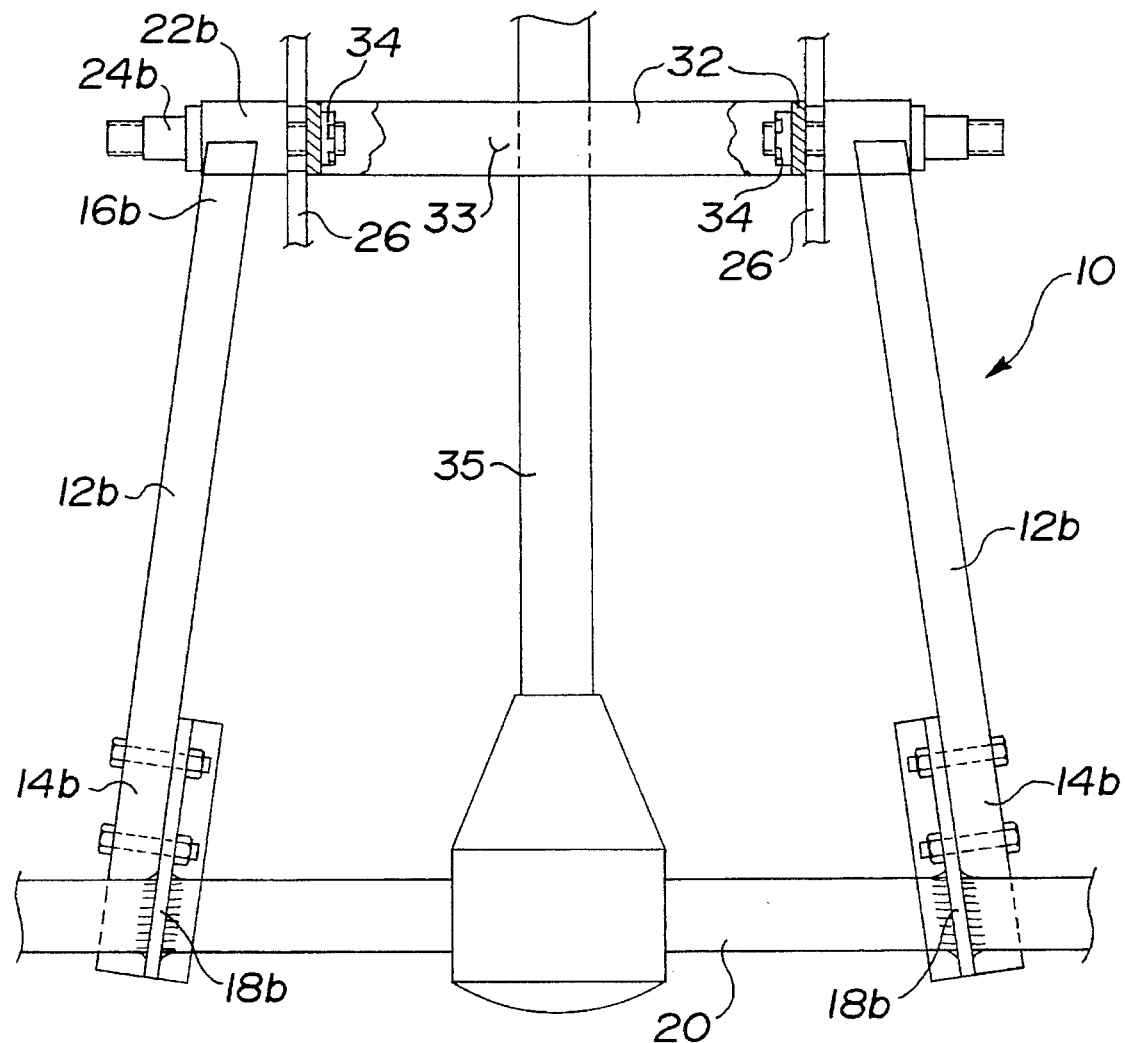
FIG. 3 is a top plan view of a kit constructed in accordance with the teachings of the present invention.
Figure 4:
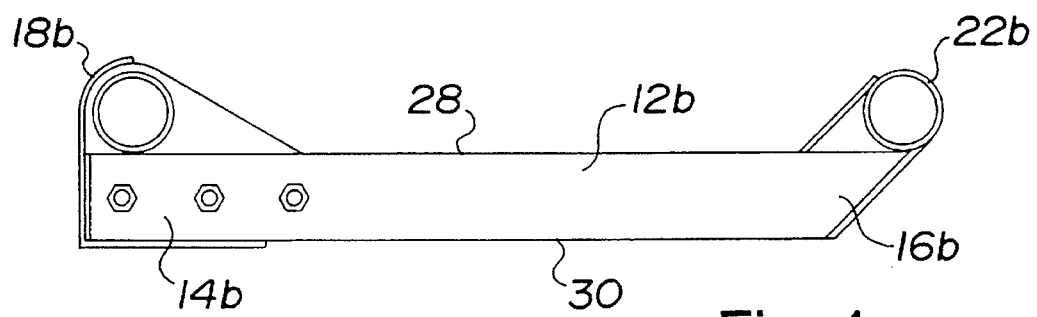
FIG. 4 is a side elevation view of a swing arm from the kit illustrated in FIG. 3.
Figure 5:
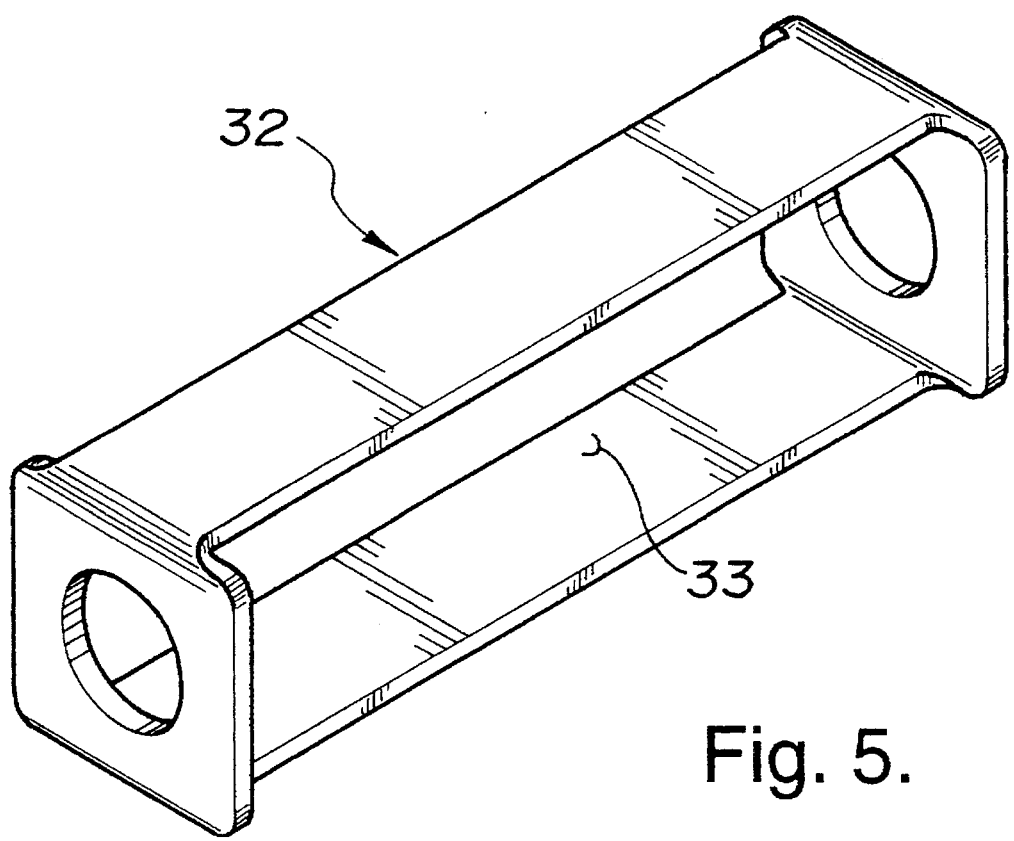
FIG. 5 is a detailed perspective view of a portion of the kit illustrated in FIG. 3.

Referring to FIGS. 3 and 4, kit 10 is unique in several respects. Kit 10 is characterized by improved swing arms 12b having a top surface 28 and a bottom surface 30. The improvement includes axle couplings 18b and pin receiving couplings 22b which extend vertically from top surface 28 of swing arms 12b. With kit 10 the top positioning of axle couplings 18b and pin receiving couplings 22b leaves the majority of top surface 28 of swing arms 12b dropped below the level of the original floor boards of the motorcycle. Swing arms 12b can pivot as intended without their movement being impeded by the original floor boards. Stated another way, swing arms 12b do not interfere with the original floor board positioning. In order to avoid lateral sway when under load, swing arms 12b are constructed of tubing which is square in cross-section. In the PRIOR ART pins 24a would sometimes become accidentally withdrawn from motorcycle frame 26. In order to prevent this from happening with kit 10, a rectangular reinforcing frame 32 is provided, as illustrated in FIG. 5. Reinforcing frame 32 is insertable within motorcycle frame 26. Longer pins 24b are used to enable motorcycle frame 26 to be pinched between pins 24b which mount second ends 16b of swing arms 12b to motorcycle frame 26 and reinforcing frame 32. Pins 24b are maintained in position by lock nuts 34.

It will be apparent to one skilled in the art that modifications may be made to the illustrated embodiment without departing from the spirit and scope of the invention as defined by the claims.

The embodiments of the invention in which an exclusive property or privilege if claimed are as follows:

1. An improvement in a kit for converting a motorcycle to a tricycle which includes a pair of swing arms having a first end and a second end, axle couplings at the first end of each swing arm whereby the swing arms are secured to an axle which supports two wheels, pin receiving couplings at the second end of each swing arm whereby the swing arms are pivotally secured by pins to a motorcycle frame, improvement characterized by:

swing arms that mount to the exterior of a motorcycle frame having a substantially planar top surface and a bottom surface, the axle coupling and the pin receiving coupling being axially offset from the swing arms and disposed above the top surface of the swing arms, thereby dropping the level of said top surface relative to said axle coupling and said pin receiving coupling.

2. The improvement as defined in claim 1, wherein the swing arms are tubular.

3. The improvement as defined in claim 2, wherein the tubular swing arms are square in cross-section.

4. The improvement as defined in claim 1, wherein a reinforcing frame is provided, the reinforcing frame being insertable within the motorcycle frame in a fixed stationary position such that the motorcycle frame is pinched between the pins mounting the second ends of the swing arms to the motorcycle frame and the reinforcing frame.

5. An improvement in a kit for converting a motorcycle to a tricycle which includes a pair of swing arms having a first end and a second end, axle couplings at the first end of each swing arm whereby the swing arms are secured to an axle which supports two wheels, pin receiving couplings at the second end of each swing arm whereby the swing arms are pivotally secured by pins to a motorcycle frame, improvement characterized by:

square tubular swing arms that mount to the exterior of a motorcycle frame having a substantially planar top surface and a bottom surface, both the axle coupling and the pin receiving coupling being axially offset from the swing arms and disposed above the top surface of the swing arms thereby dropping the level of said top surface relative to said axle coupling and said pin receiving coupling; and a rectangular reinforcing frame insertable within the motorcycle frame in a fixed stationary position such that the motorcycle frame is pinched between the pins mounting the second ends of the swing arms to the motorcycle frame and the reinforcing frame.

* * * * *